July 21, 1970 Z. SABRI LAGHAIE 3,521,007

HAND-HELD APPARATUS FOR RECORDING AND REPRODUCING ELECTROMAGNETIC IMPULSES PRINTED ON PAPER AND PRINTED BOOK

Filed July 5, 1966 5 Sheets-Sheet 1

INVENTOR.
ZARDOSHT SABRI LAGHAIE
BY
Kenyon & Kenyon
ATTORNEYS

INVENTOR.
ZARDOSHT SABRI LAGHAIE
BY Kenyon & Kenyon
ATTORNEYS

INVENTOR.
ZARDOSHT SABRI LAGHAIE
BY
Kenyon & Kenyon
ATTORNEYS

HAND-HELD APPARATUS FOR RECORDING AND REPRODUCING
ELECTROMAGNETIC IMPULSES PRINTED
ON PAPER AND PRINTED BOOK

Filed July 5, 1966 5 Sheets-Sheet 4

INVENTOR.
ZARDOSHT SABRI LAGHAIE
BY Kenyon & Kenyon
ATTORNEYS

HAND-HELD APPARATUS FOR RECORDING AND REPRODUCING ELECTROMAGNETIC IMPULSES PRINTED ON PAPER AND PRINTED BOOK

Filed July 5, 1966

INVENTOR.
ZARDOSHT SABRI LAGHAIE
BY
Kenyon & Kenyon
ATTORNEYS

United States Patent Office 3,521,007
Patented July 21, 1970

3,521,007

HAND-HELD APPARATUS FOR RECORDING AND REPRODUCING ELECTROMAGNETIC IMPULSES PRINTED ON PAPER AND PRINTED BOOK

Zardosht Sabri Laghaie, Ahwaz, Iran (% Development & Resources Corporation, 1 Whitehall St., New York, N.Y. 10004)

Filed July 5, 1966, Ser. No. 562,810
Claims priority, application Iran, Oct. 13, 1965, 5,851
Int. Cl. G11b *5/56, 21/14;* G09b *5/04*
U.S. Cl. 179—100.2 5 Claims

ABSTRACT OF THE DISCLOSURE

Self-contained hand-held apparatus for recording and transcribing audio information in the form of electromagnetic impulses on lined portions of a printed sheet comprising a housing in the shape of a fountain pen or the like containing magnetic head means having a recording-pickup portion with a traversing width at least about forty times the width of the magnetized line over which it is adapted to traverse, and further including amplifier means coupled with said head means for amplifying the electrical signals from the head, speaker-microphone means connected to the output of the amplifier means and audio transformer means interconnectable with the speaker-microphone means and the amplifier means for converting audio signals into electromagnetic impulses on the printed sheet.

This invention relates to apparatus for storing magnetic impulses corresponding to audio information on a printed surface and for audibly reproducing the information so stored and additionally relates to the related printed surface or book.

The present invention satisfies the long-standing need for a simple lightweight device for use in the teaching of foreign languages, the writing of foreign script, and additionally such a device which can be carried in the pocket and used by a tourist who is not proficient in a foreigner to obtain information when traveling in the foreign country.

Apparatus according to the principles of the invention comprises in one embodiment a lightweight hand-held housing resembling a fountain pen having at the bottom end magnetic head means having a recording-pickup portion with a traversing width at least about 40 times the width of the magnetized line over which it is adapted to traverse and includes roller means journaled to the housing adjacent the magnetic head means to provide rolling support for the apparatus as it is manually moved along a printed surface. Rotary inertia means is contained within said housing and is geared to the roller means to provide controlled manual movement of the apparatus along said surface. The magnetic head means is electrically connected to amplifier means and the latter to speaker-microphone means located within the housing at the upper end thereof.

The above pen-like device is wholly self-contained and can be used to record as well as reproduce the spoken words on or from a printed surface containing one or more lines of continuous magnetic lines.

Another embodiment of the invention is exemplified in a portable cabinet which is used in association with a book or the like and will be described in detail below.

Other objects and features of the invention will become apparent in the following description and claims and in the drawings in which:

Figures 1, 6, 7:
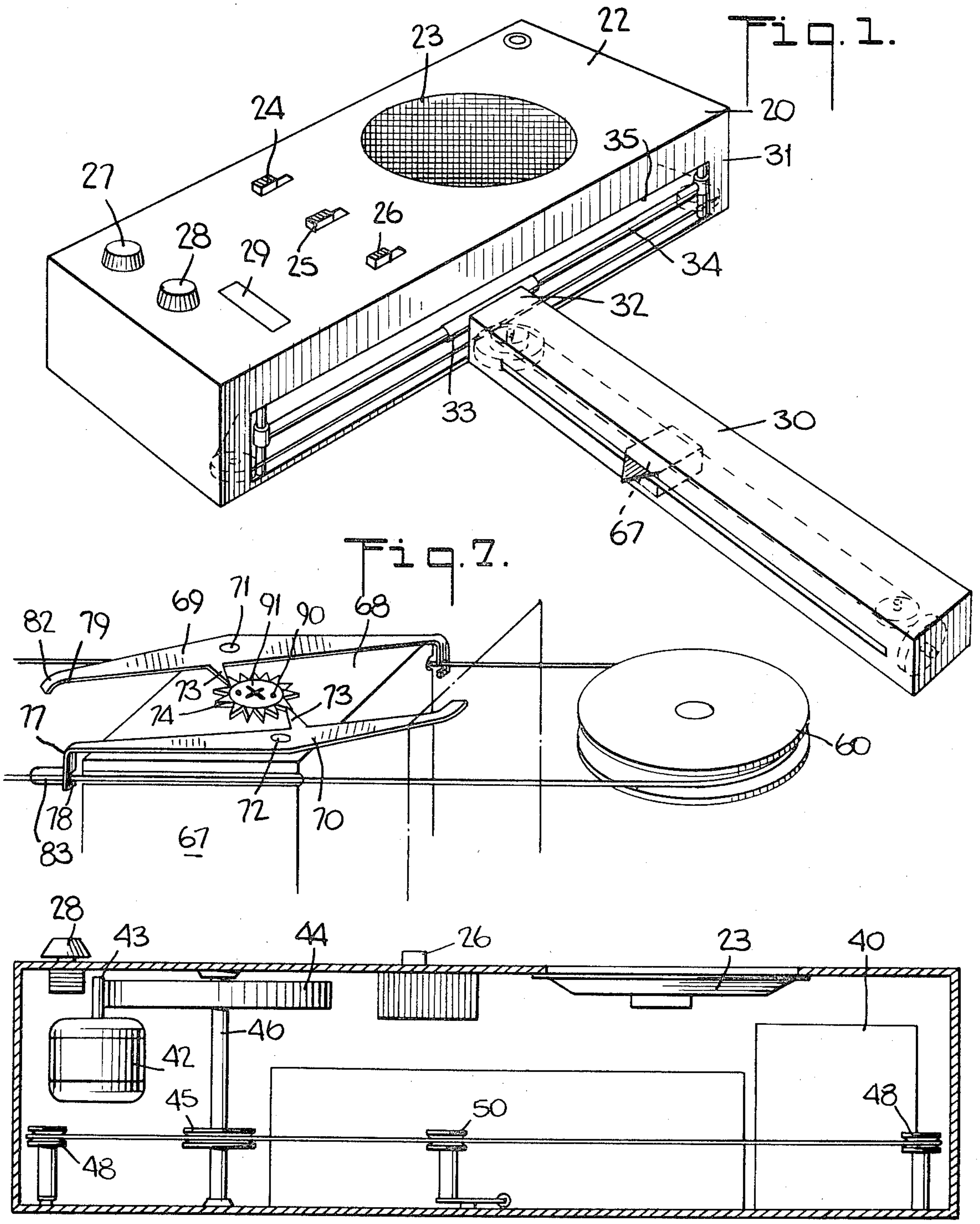
FIG. 1 is an isometric view of the cabinet-type embodiment.
FIG. 6 is a section taken along lines 6—6 of FIG. 3.
FIG. 7 is an enlarged fragmentary view of the recording-pickup head shown in FIGS. 1–3.

Referring now to the drawings, particularly FIGS. 1–7, one embodiment of the invention is shown comprising a housing or cabinet 20 of generally rectangular configuration which is adapted for placing on a table or the like (not shown) alongside book 21. Located on the top 22 of cabinet 20 are speaker 23, an on-off switch 24, recording switch 25 and reproducing switch 26, all of which will be described in detail hereinafter in connection with the electrical circuitry. Also located on the top 22 of cabinet 20 are volume control 27, tone control 28 and recording indicator 29.

Elongated hollow rectangular arm member 30 is mounted on cabinet 20 and extends outwardly from open side 31 thereof. At its inner end 32 said arm 30 is joined to sleeve 33 which is slideably mounted on rod 34 extending substantially the length of rectangular slot 35 in cabinet side 31. Such slideable connection also permits vertical pivoting of arm 30 (see FIG. 4). Rod or tube member 34 has vertical sleeve sections 36, 37 at its ends which are slideably mounted on vertical rod members 38, 39, respectively, the latter being permanently affixed to housing 20 in a standard conventional manner (see FIG. 13). Such mounting of rod member 34 permits vertical adjustment thereof to accommodate appropriate height of arm 30 above the printed surface to be traversed beneath it (see also FIG. 3).

Figure 2:
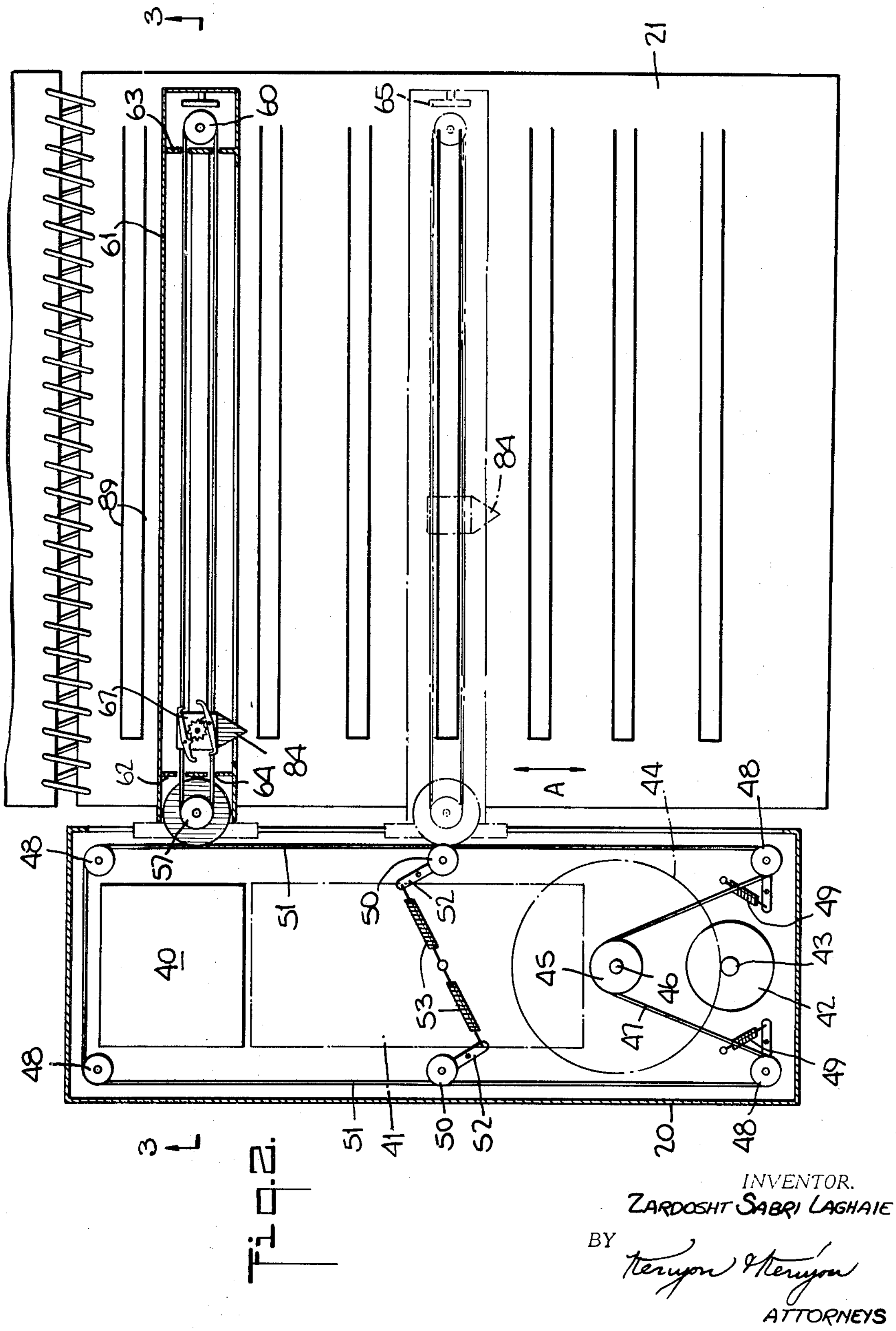
FIG. 2 is a plan view of the apparatus of FIG. 1 in combination with the book.

Disposed within cabinet 20 is battery 40, amplifier means 41 and a synchronous motor 42 as shown in FIG. 2. Motor 42 has gear means 43 on its shaft which meshes with flywheel 44 having pulley member 45 coaxially mounted on its common hub 46 which imparts driving power to continuous belt 47 trained around pulley 45 and end pulleys 48 disposed near the corners of cabinet 20. Tensioning spring means 49 are provided for two of the end pulleys 48 and additional tensioning of belt 47 is provided by pulleys 50 mounted at intermediate portions of the straight runs 51 of belt 47 on pivot arms 52 interconnected with tension springs 53 (see also FIG. 6).

Figures 3, 4, 5:
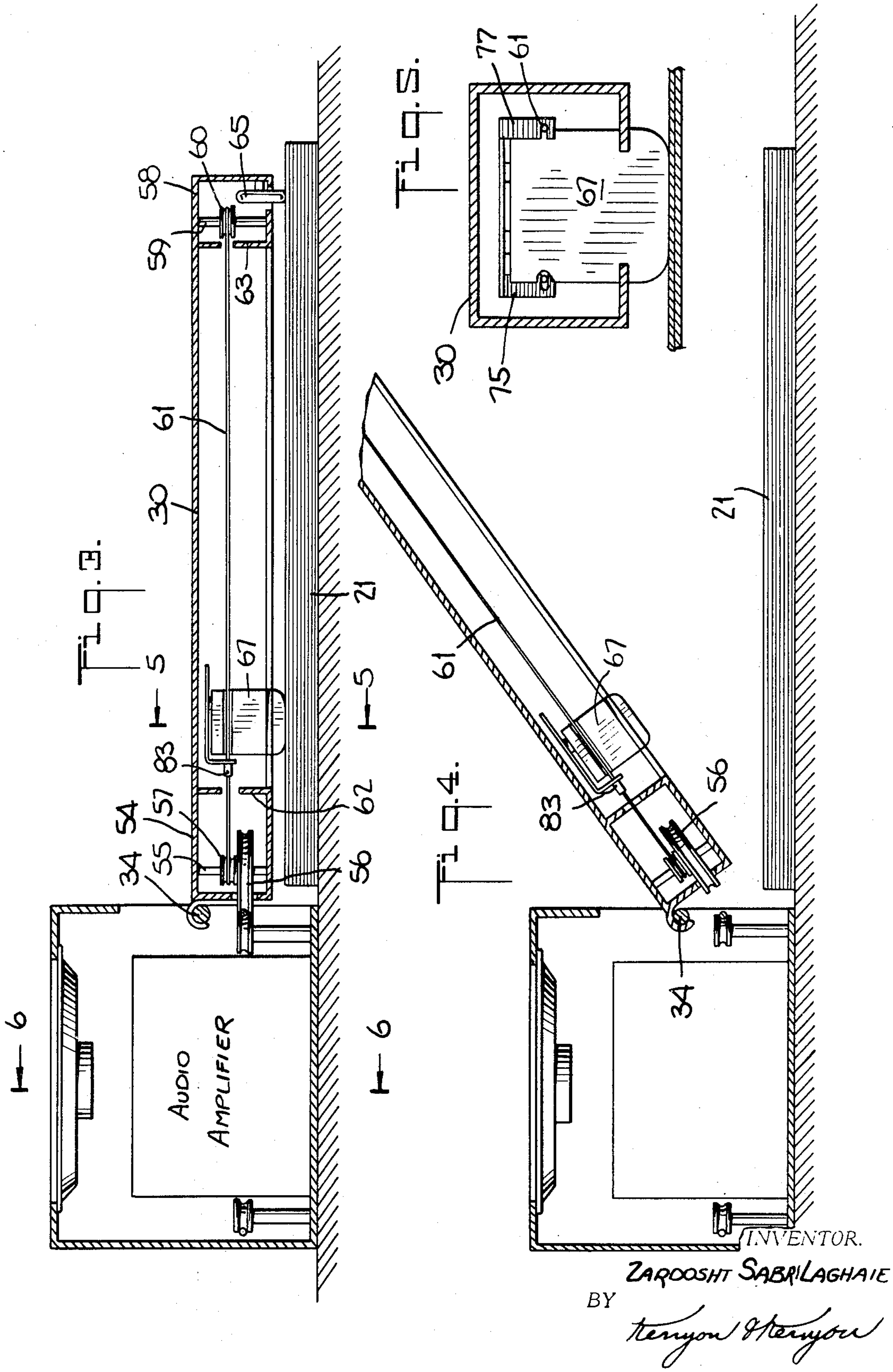
FIG. 3 is a section taken along lines 3—3 of FIG. 2.
FIG. 4 is a fragmentary section similar to FIG. 3.
FIG. 5 is a section taken along lines 5—5 of FIG. 3.

Arm member 30 contains within its housing at its inner end 54 vertical shaft 55 carrying coaxial pulleys 56, 57 and the outer end 58 of arm 30 contains a similar vertical shaft 59 with pulley 60 mounted thereon and continuous belt 61 is trained around pulleys 57, 60 as shown in FIG. 2 to provide two parallel straight runs between the pulleys. Pulley 56 is larger in diameter than pulley 57 and operatively engages belt 47 to transmit driving power to belt 61. Respective barrier plates 62, 63 are disposed transversely within arm 30 adjacent pulleys 57, 60, respectively, and contain slots 64 of sufficient dimension to permit passage of belt 61. Arm 30 also carries rotatable wheel member 65 at the bottom of its outer end 58 as shown in FIG. 3 to provide ease of movement of arm 30 in conjunction with the sliding connection at the inner end 54 to rod 34 in the directions shown by arrow A of FIG. 2. Arm 30 has an open bottom 66 between barrier members 62, 63 which constitutes the operating space for magnetic head member 67 (see also FIG. 7).

Mounted on the top 68 of magnetic head 67 are a pair of arm members 69, 70 mounted on respective pivots 71, 72 at diagonally opposed corners of top 68. Each arm 69, 70 has an inwardly facing nib 73 engageable with the teeth on ratchet wheel 74. Arm 69 has at its right hand end 75 as viewed in FIG. 7 a downwardly turned portion having a lateral slot 76 therein movable against belt 61. At the left hand end 77 of arm 70 as viewed in FIG. 7 is a corresponding downwardly turned portion with a slot 78 movable against belt 61. At the other respective ends 79, 80 of arms 69, 70 are laterally turned portions 81, 82 which are engageable with their respective barriers 62, 63 at the limits of reciprocal movement of head 67. Reciprocal movement of head 67 with respect to arm 30 is provided by lock member 83 affixed to belt 61 which engages downwardly turned portion 77 or 75 of arm member 70 or 69, as the case may be, and causes magnetic head 67 to be carried along with the direction of movement of belt 61. When engaged with portion 77 of arm 70 as shown in FIG. 7 and FIG. 3 the head 67 will be moved from left to right as viewed in FIG. 3 or from the inner end 54 to outer end 58 of arm 30. As the head 67 approaches barrier 63 the lateral portion of arm 70 will engage barrier 63 causing end 77 to pivot away from belt 61 and disengage from lock member 83 thereon causing the head 67 to stop. Such pivoting motion of arm 70 causes nib 73 to engage ratchet wheel 74 and rotate it one step in a counterclockwise direction as viewed in FIG. 7 thereby causing arm 69 to pivot in a clockwise direction and its slot 76 to contact belt 61 and when lock member 83 passes around pulley 60 to engage downwardly turned portion 75 and cause the head 67 to move back in the other direction toward the inner end of arm 30.

Head 67 is provided with a lateral indicator point 84 to assist alignment with the printed page as will be discussed hereinafter.

Figures 11, 12, 13:
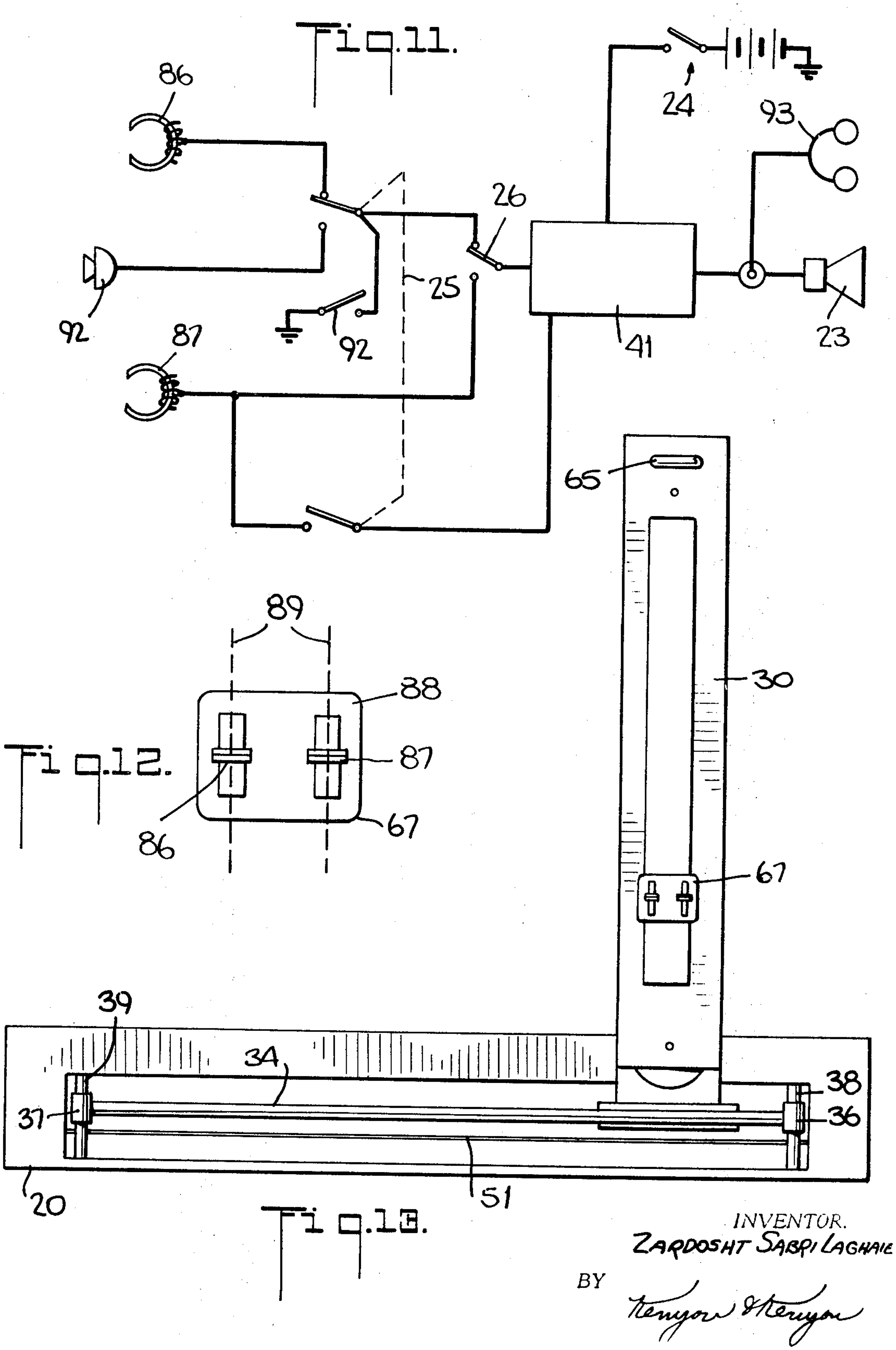
FIG. 11 is an electrical schematic for the FIG. 1 embodiment.
FIG. 12 is an enlarged bottom view of the recording-pickup head of FIG. 5.
FIG. 13 is an enlarged side view of the device shown in FIG. 1.

The electrical circuitry for the above embodiment is shown in FIG. 11 wherein power is provided by battery 85 and on-off switch 24 which delivers appropriate power to the audio amplifier stage 41 which consists of any standard means of audio-amplification, for example, a plurality of transistor amplifier stages. In the embodiment shown are two magnetic heads 86, 87 alternately connectable into the electrical circuitry by switch means 25. As shown in FIG. 12, magnetic heads 86, 87 are disposed at laterally spaced positions on the bottom 88 of head 67 and permit the successive reading of two adjacent magnetic lines 89 on the printed surface with one complete back and forth traverse of head 67 for a given position of arm 30. Actuation of ratchet 74 by arm 70 at the outer barrier 63 causes one of the electrical contacts 90 to engage stationary electric contact 91 (see also FIG. 7) which constitutes the closing of switch 92 shown in FIG. 11 and shorts out magnetic head 86, putting head 87 into the circuit for the ensuing traverse of head 67.

Microphone 92 can be connected into the circuit by depression of switch 25 and speaker 23 and optionally head phones 93 are provided at the output of amplifier 41. In use the cabinet 20 is disposed adjacent a printed page 21 as shown in FIG. 2 and arm 30 is positioned thereover at the appropriate location for traversing a pair of magnetic lines 89 imprinted thereon. Indicator 84 assists in thus positioning arm 30 and head 67 is at the start located adjacent the inner end 54 of arm 30. If lines 89 already contain stored magnetic impulses then switches 24 and 26 are closed and power supplied to motor 42, whereupon head 67 traverses back and forth converting through successive use of heads 86, 87 the corresponding audio information which is amplified in amplifier 41 and reproduced in speaker 23 of heat set 93.

In conjunction with the magnetic lines may be either pictures or written characters or whatever corresponding to the recorded information and in this manner various types of language studies can be achieved.

The magnetic lines 89 below the book's regularly printed characters or pictures are composed of any suitable magnetizable material such as iron oxide with a gelatin binder to provide flexibility. The lines are not greater than about 0.2 millimeter in width and may be inscribed on the pages of the book either before or after the printing thereof and the traversing of the heads 86, 87 are about 40 times wider than the magnetic recording lines so that fluctuations in relative orientation of the head relative to the lines will not cause undesired fluctuations in the reproduced or recorded sound.

When it is desired to record on the magnetic lines of the book switch 25 is depressed putting microphone 92 in the circuit in conjunction with head 87 and the sound from microphone 92 travels through amplifier 41 and head 87 to cause magnetic impulses to be impressed on the magnetic lines corresponding to the sound.

Experiments suggest that the best means for recording are 4.75 centimeters per second and 2.35 centimeters per second. Accordingly the scanning times in a 25 centimeter-wide sheet of paper are respectively 5½ seconds and 11 seconds. The above equipment read twelve words per line with the first speed and twenty words per line with the second.

Belt 47 and its support pulleys 48 are also vertically adjustable to the same extent as rod 34.

Figures 8, 9, 10:
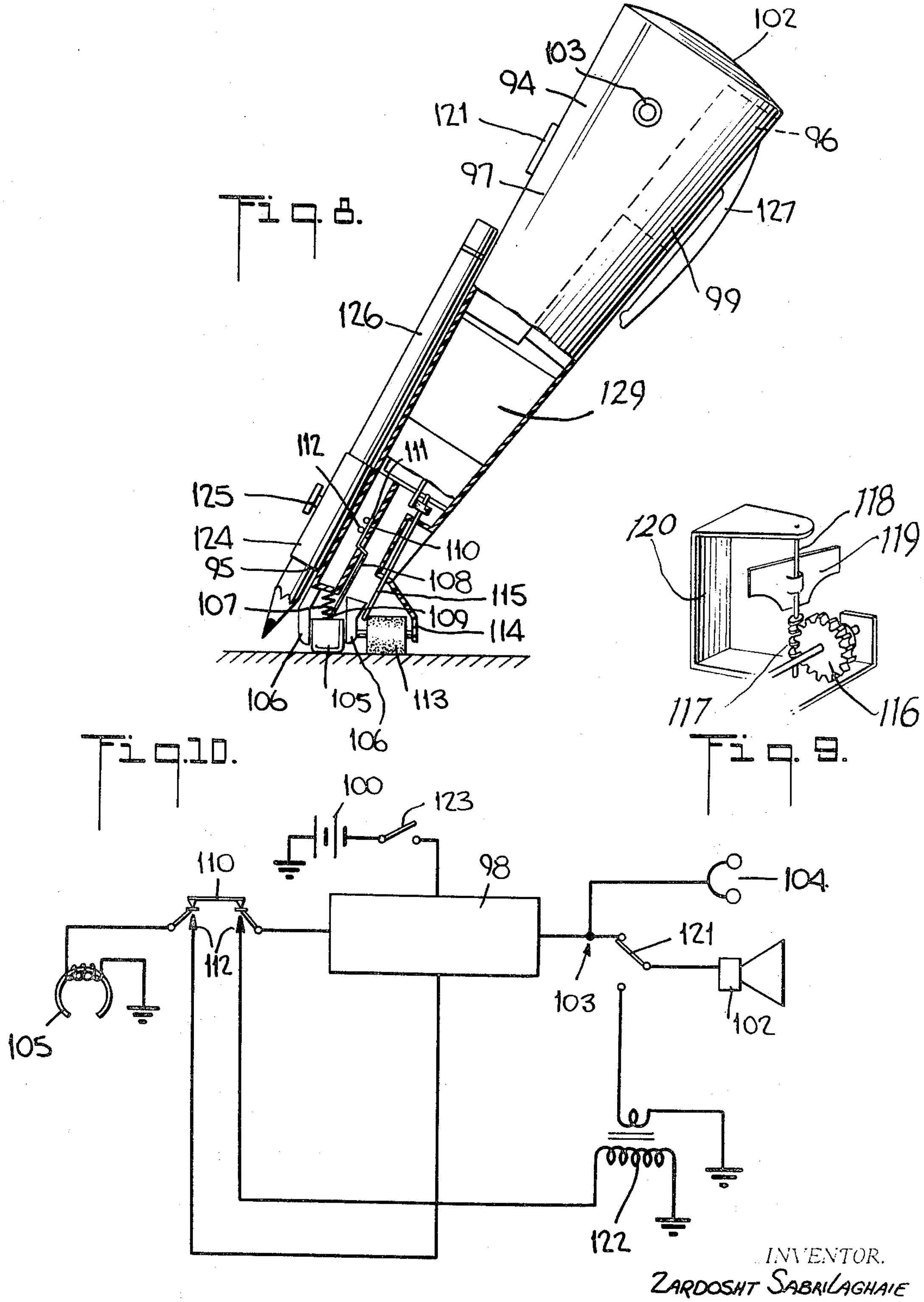
FIG. 8 is a side view of the pen-like embodiment in partial section.
FIG. 9 is an enlarged isometric view of the inertia means.
FIG. 10 is a schematic diagram of the electrical circuitry of the FIG. 8 embodiment.

Referring now to the embodiment shown in FIGS. 8–10 inclusive, there is housing 94 having a longitudinal taper as shown in FIG. 8 with the narrow end at the bottom 95 and the larger end 96 at the top enclosing within upper portion 97 the audio amplifier 98 (see also FIG. 10) within upper portion 99 battery 100 and within its upper end 101 speaker 102 with phone jack 103 into which head set 104 can be connected. At the bottom end 95 is magnetic head means 105 resiliently held by support 106 in any suitable conventional manner, the resilience being provided by spring means 107. Armature 108 is affixed at its upper end 111 engageable with electrical contacts 112 upon upward movement of magnetic head 105 as viewed in FIG. 8 in response to downward manual pressure in housing 94 during use. Mounted adjacent to head 105 is cylindrical rubber roller 113 which is journaled between housing extension 114 and head support 106 and frictionally bears against rotary shaft 115 having gear member 116 affixed thereto which meshes with wormgear 117 on shaft 118 carrying inertia means constituted by vane 119 mounted internally of said housing by support bracket 120. Syncronous motor 129 can be used for automatic movement of said apparatus along said surface. The electrical circuitry includes recording switch 121 which in its normal position connects speaker 102 to the output of amplifier 98 and when depressed connects speaker 102 through audio transformer 122 and switch 110 to magnetic head 105 for recording purposes. On-off switch 123 when closed supplies voltage from battery 110 to amplifier 108 and motor 129.

Included is a pencil holder 124 mounted on the housing 94 with adjustable screw 125 for holding pencil 126 which can be used for writing exercises in foreign language studies if desired. Clip 127 near the upper part of housing 94 is provided to clip the entire devices to a pocket or the like.

The above device is used by placing the magnetic head against the magnetized lines on the printed page and supporting the device on roller 113 and then moving the entire device by hand laterally along the line. Switch 112 is closed by downward pressure and the on-off switch 123 being closed the stored magnetic pulses are converted to audio pulses and amplified by amplifier 98 and produced by speaker 102. The inertia means 119 coupled with roller 113 tends to provide uniform manual movement of head 105 along the magnetized line to provide consequent uniform audible reproduction with a minimum of waver of sound.

The traversing width of head 105 is about 40 times wider than the magnetic line which is 0.2 millimeter and the head can be moved through a horizontal angle of about 85 degrees relative to the line without sound distortion. This self-contained hand-held unit can be used both for recording and playback, the latter accomplished by depression of switch 121 and speaking into speaker 102 as a microphone whereupon the audible sound is converted by magnetic head 105 into magnetic pulses on the paper.

It can be seen from the above description that both embodiments fulfill all of the desired features mentioned previously.

The book which is used with the above equipment can be printed with the same standard equipment as any ordinary book with the exception that the printing stock is inscribed with magnetic lines. These can be arranged as desired and associated with pictures, printing, script, or the like, and after printing the paper passes under a recording machine utilizing the circuitry described above where the sound corresponding to the printed words or describing the picture or script can be recorded on the appropriate magnetic lines. In order to expedite the recording and printing of this book, the sound or words could be taped prior to the printing at a normal speed, and then played back at a much higher speed and recorded on the magnetic lines adjusted and synchronized with the position of the printed words. Since the original speed at which the words were recorded and the speed with which they are played back are the same, the sound would be quite normal and natural.

While certain embodiments of the invention have been shown and described, it is to be understood that changes may be made by those skilled in the art without departing from the scope and the spirit of the invention.

I claim:

1. Apparatus for converting electromagnetic impluses contained on fine lined portions of a printed sheet to audible information and vice versa comprising a self-contained unit adapted to be held in the hand as a fountain pen or the like containing magnetic head means having a recording-pickup portion with a traversing width at least about forty times the width of the magnetized line over which it is adapted to traverse, amplifier means coupled with said head means for amplifying the electrical signals from said head means, speaker-microphone means interconnected with the output of said amplifier means for providing audible reproduction of said signals and for audio input, audio transformer means, switch means for substituting said audio transformer means in the above circuit for said amplifier means for transmitting audio signals received by said speaker-microphone means externally thereof to said head means for conversion into electromagnetic impulses in said printed sheet.

2. Apparatus according to claim 1 including an elongated external housing carrying head means, amplifier means and said speaker-microphone means and adapted to be held in the hand, said housing having a first end carrying said speaker-microphone means and a second end carrying said magnetic head means, roller means journalled to said housing adjacent said head means to provide rolling support for said apparatus on a surface, inertia means mechanically coupled with said roller means for providing controlled manual movement of said apparatus along said surface.

3. Apparatus according to claim 1 including an elongated external housing carrying head means, amplifier means and said speaker-microphone means and adapted to be held in the hand, said housing being tapered longitudinally with an enlarged end carrying said speaker-microphone means and a narrow end carrying said magnetic head means, roller means journalled to said housing adjacent said head means to provide rolling support for said apparatus on a surface, rotary inertia means disposed internally of said housing and geared to said roller means for providing controlled manual movement of said apparatus along said surface.

4. Apparatus according to claim 1 including an elongated external housing carrying head means, amplifier means and said speaker-microphone means and adapted to be held in the hand, said housing being tapered longitudinally with an enlarged end carrying said speaker-microphone means and a narrow end carrying said magnetic head means, roller means journalled to said housing adjacent said head means to provide rolling support for said apparatus on a surface, rotary inertia means disposed internally of said housing and geared to said roller means for providing controlled manual movement of said apparatus along said surface, means on said housing for releasably holding a pencil.

5. Apparatus according to claim 1 including an elongated external housing carrying head means, amplifier means and said speaker-microphone means and adapted to be held in the hand, said housing being tapered longitudinally with an enlarged end carrying said speaker-microphone means and a narrow end carrying said magnetic head means, roller means journaled to said housing adjacent said head means to provide rolling support for said apparatus on a surface, rotary inertia means disposed internally of said housing and geared to said roller means for providing controlled manual movement of said apparatus along said surface, means on said housing for releasably holding a pencil and clip means in said housing for releasably clipping said apparatus to a pocket or the like.

References Cited

UNITED STATES PATENTS

| | | | |
|---|---|---|---|
| 2,548,011 | 4/1951 | Frost | 35—35 |
| 2,822,425 | 2/1958 | Hicks | 179—100.1 |
| 2,866,279 | 12/1958 | Surber | 35—35 |
| 3,070,668 | 12/1962 | Owner et al. | 179—100.2 |

BERNARD KONICK, Primary Examiner

J. P. MULLINS, Assistant Examiner

U.S. Cl. X.R.

35—35

PO-1050
(5/69)

UNITED STATES PATENT OFFICE
CERTIFICATE OF CORRECTION

Patent No. 3,521,007 Dated July 21, 1970

Inventor(s) Z. Sabri Laghaie

It is certified that error appears in the above-identified patent and that said Letters Patent are hereby corrected as shown below:

Column 1, line 42, after "a" (second occurrence), insert -- foreign language to convey brief statements to a --;

Column 3, last line, change "heat" to -- head -- ;

Column 4, line 52, correct spelling of "synchronous" ;

Column 4, line 60, after "battery" change "110" to -- 100 -- ;

Column 4, line 65, change "devices" to -- device -- .

SIGNED AND SEALED NOV 24 1970

(SEAL)
Attest:

Edward M. Fletcher, Jr.
Attesting Officer

WILLIAM E. SCHUYLER, JR.
Commissioner of Patents